United States Patent
Strandberg et al.

(10) Patent No.: US 10,865,078 B1
(45) Date of Patent: Dec. 15, 2020

(54) LIFTING ASSEMBLY FOR ELEVATING COMPONENTS TO A WIND TURBINE AND A METHOD FOR USING THE LIFTING ASSEMBLY

(71) Applicant: S&L Access Systems AB, Västerås (SE)

(72) Inventors: Michael Strandberg, Stockholm (SE); Kenneth Lundberg, Västerås (SE)

(73) Assignee: S&L Access Systems AB, Västerås (SE)

( * ) Notice: Subject to any disclaimer, the term of this patent is extended or adjusted under 35 U.S.C. 154(b) by 0 days.

(21) Appl. No.: 16/627,893

(22) PCT Filed: Jun. 28, 2018

(86) PCT No.: PCT/EP2018/067470
§ 371 (c)(1),
(2) Date: Dec. 31, 2019

(87) PCT Pub. No.: WO2019/020310
PCT Pub. Date: Jan. 31, 2019

(30) Foreign Application Priority Data

Jul. 27, 2017 (EP) .................................... 17183423

(51) Int. Cl.
*B66C 23/18* (2006.01)
*B66C 23/20* (2006.01)
*F03D 13/10* (2016.01)

(52) U.S. Cl.
CPC .......... *B66C 23/185* (2013.01); *B66C 23/207* (2013.01); *F03D 13/10* (2016.05); *F05B 2230/61* (2013.01)

(58) Field of Classification Search
CPC ..... B66C 23/185; B66C 23/207; B66C 23/16; B66C 23/163; B66C 23/166; F03D 13/10; F05B 2230/61
See application file for complete search history.

(56) References Cited

U.S. PATENT DOCUMENTS

| 9,266,701 B2 | 2/2016 | Bosco et al. |
| 2012/0027523 A1 | 2/2012 | Vanderbeke |

(Continued)

FOREIGN PATENT DOCUMENTS

| CA | 2924791 A1 | 3/2015 | |
| JP | 10205428 A * | 8/1998 | ........... B66C 23/207 |

(Continued)

OTHER PUBLICATIONS

Extended European Search Report Application No. EP 17 18 3423 Completed: Jan. 3, 2018; dated Jan. 15, 2018 5 pages.

(Continued)

*Primary Examiner* — Michael R Mansen
*Assistant Examiner* — Juan J Campos, Jr.
(74) *Attorney, Agent, or Firm* — Welsh IP Law LLC

(57) ABSTRACT

A lifting assembly for elevating components to a wind turbine. The lifting assembly comprises a plurality of tower segments adapted to be arranged on top of each other to form an elongated tower, and a lifting device including a support frame for supporting the tower, a securing assembly for securing the tower to the wind turbine, and a crane having a base part and a jib rotatably connected to the base part. The lifting device comprises a platform arranged vertically moveable between a lower and an upper position. The platform has a first storage area for supporting components with a weight of more than 10 tons. The crane is mounted on the platform and is configured to move the components between the platform and the wind turbine when the platform is in the upper position. The platform is provided with an opening adapted to receive the tower segments. The crane and the first storage area are arranged on opposite sides of the opening, and one of the tower segments is a top segment having an upper part provided with a second storage area for supporting components with a weight of more than 10 tons.

(Continued)

The invention also relates to a method for using the lifting assembly for replacing an old component of a wind turbine with a new component.

15 Claims, 11 Drawing Sheets

(56) References Cited

U.S. PATENT DOCUMENTS

| | | | |
|---|---|---|---|
| 2012/0131880 A1 | 5/2012 | Delago et al. | |
| 2014/0034418 A1 | 2/2014 | Olea Porcel et al. | |
| 2014/0202971 A1 | 7/2014 | Bosco et al. | |
| 2016/0229671 A1* | 8/2016 | Herse | B66C 13/08 |
| 2016/0237985 A1* | 8/2016 | Bogl | B66C 23/185 |
| 2017/0334685 A1* | 11/2017 | Kersten | B66C 23/185 |

FOREIGN PATENT DOCUMENTS

| | | | | |
|---|---|---|---|---|
| JP | 10205429 A | * | 8/1998 | B66C 23/207 |
| JP | 10205430 A | * | 8/1998 | B66C 23/207 |
| JP | 2003184730 A | | 7/2003 | |
| JP | 2008094628 A | * | 4/2008 | F03D 13/20 |
| JP | H-4751478 | * | 8/2011 | B66C 23/20 |
| WO | 2008084970 A1 | | 7/2008 | |
| WO | WO-0104039 | * | 1/2011 | E04H 12/20 |
| WO | 2012140278 A1 | | 10/2012 | |
| WO | WO-2012163906 | * | 12/2012 | F03D 1/00 |
| WO | WO-2016091413 | * | 6/2016 | B66C 23/18 |

OTHER PUBLICATIONS

International Search Report and Written Opinion of the International Searching Authority Application No. PCT/EP2018/067470 Completed: Aug. 30, 2018; dated Sep. 7, 2018 11 pages.

* cited by examiner

LIFTING ASSEMBLY FOR ELEVATING COMPONENTS TO A WIND TURBINE AND A METHOD FOR USING THE LIFTING ASSEMBLY

TECHNICAL FIELD

The present invention relates to a lifting assembly for elevating components to the top of a wind turbine. The invention also relates to a method for using the lifting assembly for transportation of components to and from the top of a wind turbine during maintenance of the wind turbine.

BACKGROUND OF THE INVENTION

Wind turbines today require regular maintenance of its main components, such as rotor blades, gear boxes and generators. However, these components are often large and heavy, which poses an issue during both the assembly and the maintenance of the wind turbines. For example, the gear boxes may weigh between 20-45 tons, and the generators may weigh between 15-30 tons. Today, the most common solution is to use large, heavy cranes that lifts the components from the ground with long wires. One of the problems with these cranes is that they are highly sensitive to wind, and cannot operate while the wind velocity exceeds certain limits, since the crane becomes too unstable and the wire might start to swing. This can result in stoppage of production for long periods of time, decreasing the profitability of the wind turbines. Additionally, the large size and weight of the cranes most commonly used today cause problems with transportation and assembly of the cranes. A large amount of vehicles are required today to transport the different parts of the cranes, and once the transportation is completed, the assembly of these parts takes a very long time to finish. All the problems mentioned above cause the assembly and the maintenance of the wind turbines to become expensive and time consuming.

U.S. Pat. No. 9,266,701 B2 discloses an enhanced stability crane, including a telescoping main support mast upon which a crane base resides. A boom projects upwardly from the crane base and a jib typically projects upwardly from the boom. The crane is adapted to have a load capacity of at least 160,000 pounds and a maximum jib height of at least 262 feet. This invention addresses the issue of stability by using a clamping assembly which resides on the main support mast and is configured to attach to an existing structure adjacent to the crane. This clamping assembly enhances the stability of the mast. The size and weight of the enhanced stability crane is also reduced in comparison to the cranes most commonly used today. However, a problem with this invention is that it does not account for the instability of the crane's wire, meaning it is still sensitive to high winds. Another disadvantage is that the crane residing on the main support mast is large and heavy, increasing the overall size and weight of the invention.

Accordingly, there is a need for a lifting assembly for lifting and positioning the main components of wind turbines, which is smaller in size, less heavy and more resistant to wind.

SUMMARY

It is an object of the present invention to at least partly overcome the above problems, and to facilitate transportation of components to and from the top of a wind turbine.

According to one aspect of the invention, this object is achieved by a lifting assembly as defined in the claims.

The lifting assembly comprises a plurality of tower segments which together form an elongated tower with an adjustable length and a lifting device for lifting and moving the components. The lifting device comprises a support frame for supporting the tower, a securing assembly for securing the tower to the wind turbine, and a crane. The lifting device further comprises a platform arranged above the support frame. The platform is arranged moveable relative the support frame between a lower position and an upper position. The platform has a first storage area for supporting components weighing more than 10 tons. The crane is mounted on the platform and is configured to move the components between the platform and the wind turbine when the platform is in the upper position. The platform is provided with an opening adapted to receive the tower segments. Since the opening is adapted to receive the tower segments, the opening and the tower segments preferably have a corresponding shape. The crane and the first storage area are arranged on opposite sides of the opening, and one of the tower segments is a top segment having an upper part provided with a second storage area for supporting components weighing more than 10 tons.

The length of the tower depends on the height of the wind turbine. Preferably, the elongated tower is higher than 60 m, more preferably higher than 80 m, and most preferably higher than 100 m. However, if necessary the tower can be more than 120 m. The tower segments are adapted to be arranged on top of each other to form the tower. By means of arranging the tower segments on top of each other the tower's height can be modified and the tower is also easy to dismantle, thus facilitating the transport of the tower. The number of tower segments can be varied in dependence on the height of the wind turbine and the length of the tower segments. Preferably, the number of tower segments is more than 6, more preferably more than 8, and most preferably more than 10. The tower segments can be arranged in different ways in order to form a tower with an adjustable length. For example, the tower segments can be individual segments which are mounted on top of each other when the tower is built. Alternatively, the tower segments are slidably connected to each other to form a telescopic tower. Since a plurality of tower segment makes up the tower, each tower segment can be made at such a low height that the vehicles delivering the tower segment can do so without requiring any extra transporting measure as e.g. using an escort. The length of the tower segments may vary. In order to facilitate transportation of the tower segments, the length of the tower segments may vary between 2-10 m. However, it also possible to have tower segments with a length up to 24 m.

By having the crane mounted on a platform movable between a lower and an upper position relative the support frame allows the crane and the components to be moved in a vertical direction along the wind turbine. Since the platform has a first storage area for supporting components weighing more than 10 tons, the crane can pick up components from the ground, place it on the storage area and by means of the platform raise it to the upper position. At the upper position, the crane can pick up the component again and move it to the desired location on the wind turbine. This feature has the advantage of being a far more stable way for transporting a component up to the top of a wind turbine than by e.g. using a large crane having long wires that can cause the component to start swinging. In the present invention, the lifting of the component onto the platform is done in the lower position and the lifting of the component onto the wind turbine is done in the upper position. This allows for the lifting distance to be minuscule compared to the conventional methods where the component is lifted directly from the ground onto the top of the wind turbine.

The platform is protruding on opposite sides of the top segment when the platform is in the upper position. The opening in the platform allows the platform to have a stable and easy connection to the tower. Further, the opening allows the platform to protrude a distance at different horizontal directions from the tower. This provides for a plurality of spaces for housing devices and objects at opposite positions relative the tower such as e.g. the crane and the component to be transported. Due to the fact that the crane and the first storage area are arranged on opposite sides of the opening, the weight of the crane and the component will balance each other during transportation of the components to and from the top of the wind turbine as the weight on each side of the tower is substantially equal. This is particularly important when the platform is being moved upwards or downward along the tower, since an unbalanced platform will cause wear on the drive mechanism for moving the platform. This is also beneficial due to the fact that a balanced platform will not cause as much strain on the tower. Thus, wearing of the tower segments will be less.

As mentioned, one of the tower segments is a top segment having an upper part provided with a second storage area for supporting components with a weight of more than 10 ton. This feature is particularly useful when an old component is to be replaced with a new component on the wind turbine as the top segment provides an area accessible in the upper position for storing a component. The old component can then be arranged on the second storage area while the new component is positioned on the wind turbine. Due to the fact that the second storage area is arranged on the upper part of the top segment, the second storage area is disposed on top of the tower and by that is supported by the tower. Thus, the component will not cause any torque on the tower when the component is positioned on the second storage area. Since the upper part provided with the second storage area is resting on the tower, when placing a component on the second storage area, the weight of the component causes a force directed vertically through the length of the tower to the ground where it will be counteracted by the ground. An advantage with this feature is that the platform is prevented from becoming unbalanced as it could become if the old component would be placed on the platform whilst the new component is still resting on the platform. An unbalanced platform may cause the driving mechanism to fail or to become worn out.

The first and second storage areas are designed for supporting components weighing more than 10 tons. This means that the storage areas are designed to have the mechanical strength needed to support components weighing more than 10 tons. Suitably the top segment, the other tower segments, and the platform are made of metal, such as stainless steel, in order to provide the mechanical strength needed to allow the components to be transported on the platform and to be positioned on the second storage area during replacement of the components of the wind turbine. Preferably, the first and second storage areas are designed for supporting components weighing more than 20 tons, and preferably the first and second storage areas are designed for supporting components weighing more than 30 tons to allow the storage areas to support heavy component of the wind turbine, such as the gear box, the generator and the turbine blades.

In one embodiment of the invention, the platform is arranged linearly movable relative the tower.

According to an embodiment of the invention, the top segment comprises a cap connected to the upper part and having an upper surface defining the second storage area. The cap is adapted to support the components that are placed on the second storage area. The cap can be used to support old components that has been removed from the wind turbine during the lifting of new components from the first storage area onto the wind turbine. Using a cap is an easy way to create a surface to be used as a second storage area. Suitably, the cap is made out of metal, making the cap able to withstand the weight of the old components without deforming. Suitably, the cap is disc shaped. The shape of the periphery of the cap can be varied in dependence on the shape of the tower segment. In one embodiment, the cross-section of the tower segment is rectangular, and the cap is rectangular. For example, the cap is a metal plate. In one embodiment, the cap is a rectangular metal plate having a substantially flat upper surface.

According to an embodiment of the invention, the cap is removably connected to the upper part. Since the cap is a separate piece, it can be connected to any of the tower segments. The tower segment with the cap connected to it will become the top segment. This means that any tower segment can be used as the top segment. The cap is provided with one or more connection devices for removably connecting the cap to one of the tower segments. For example, the connection devices are a plurality of protruding elements. The tower segments are provided with connection means adapted to cooperate with the connection devices of the cap in order to connect the cap to the tower segment. For example, the tower segments are provided with recesses adapted to receive the protruding elements of the cap.

According to an embodiment of the invention, at least two of the tower segments have different heights and the cap can be removably connected to each of said at least two tower segments. Thus, it is possible to tune the height of the tower to the height of the nacelle of wind turbine.

According to an embodiment of the invention, the lifting device comprises a drive unit for moving the platform and a power generation device configured to generate electric power to the drive unit, and the power generation device is mounted on said platform. For example, the power generation device is a diesel powered power plant. By placing the power generation device on the platform, the distance between the power generation device and the drive unit is short. Thus, the cables between the power generation device and the drive unit are short and will not be a hindrance for moving the platform. Since the power generation device does not need to be positioned on the ground, and it is not necessary to use long cables for connecting the power generation device to the drive unit, which simplifies the moving of the platform.

According to an embodiment of the invention, the power generation device is arranged on the same side of said opening as the crane. By arranging the power generation device in this manner, its weight, along with the weight of the crane, helps compensate for the weight of the components being supported on the first storage area, meaning the platform will become more balanced in weight. This is particularly important when the platform is being moved along the tower, since an unbalanced platform will cause wear on the drive unit. This arrangement of the power generation device is also preferable since the power generation device will not be obstructing the crane as it lifts the components to and from the wind turbine. However, the power generation device can also be arranged on the same side of the opening as the first storage area.

According to an embodiment of the invention, the platform has a length of at least 4 m and a width of at least 2 m, and preferably said platform has a length of at least 6 m and a width of at least 3 m. The size of the platform needs to be large enough to accommodate the crane, the power generation device, and the components supported on the first and second storage areas. Suitably, the area of the opening in the platform is at least 4 m². For example the length and width of the opening is at least 2 m. This size allows the opening to receive the tower segments.

According to an embodiment of the invention, the platform is protruding at least 1.5 m, and preferably at least 2 m from the opening in two opposite directions in a horizontal plane. By designing the platform in this manner, enough space is provided on each side of the opening for the different objects needed to be placed on the platform, e.g., the components and the crane. Also, by making space on each side of the platform, instead of, for instance, placing the opening a lot closer to one end, the balance of the lifting assembly is improved. This is due to the fact that objects can be placed on either side of the opening. This improves the stability of the lifting assembly.

According to an embodiment of the invention, the crane has a base part and a jib rotatably connected to the base part, and the jib has a maximum length of less than 40 m, and preferably the jib has a maximum length of less than 30 m. A crane with a shorter jib is less expensive than a crane with a longer jib. A jib length longer than 40 m is not necessary since the crane can move up and down along the wind turbine and thus reach a closer proximity. Due to the fact that the crane is positioned on the platform, the distance the components have to be moved by means of the crane is less than in the prior art and accordingly a crane with a shorter jib can be used. A smaller crane, with a jib length of less than 40 m, further increases the stability of the tower considering the lever principle.

According to an embodiment of the invention, the opening and the peripheries of the tower and the cap are rectangular. A rectangular tower is easier and accordingly cheaper to manufacture.

According to an embodiment of the invention, each of the tower segments comprises gear racks and the drive unit comprises gear wheels adapted to engage with the gear racks on the tower segments, and the drive unit is adapted to rotate the gear wheel. This is a simple way for transporting the platform to the upper position, making the assembly of the tower less time consuming. The amount of gear wheels used can vary, but suitably three gear wheels are used. By using several gear wheels, the load on each wheel is decreased, meaning that they are worn out less quickly than if fewer gear wheels are used.

According to an embodiment of the invention, the weight of the crane is more than 10 tons. A crane smaller than 10 tons might not be able to lift necessary objects, e.g. the components of the wind turbine and segments of the tower.

According to an embodiment of the invention, the weight of the crane is less than 40 tons, and preferably less than 30 tons. A crane less heavy than 40 tons, and preferably less heavy than 30 tons, is less expensive and easier to transport on the platform to the top of the wind turbine than a heavier crane.

According to an embodiment of the invention, the platform is provided with protruding extendable beams for supporting a wind turbine roof. The roof of the wind turbine needs to be removed while changing components of the wind turbine, and when removed, the wind turbine roof needs to be placed somewhere. By providing the platform with protruding extendable beams for supporting the wind turbine roof, the crane can easily place the wind turbine roof on these protruding extendable beams. This means that the wind turbine roof does not need to be placed, e.g., on the ground, and therefore the need for long wires is eliminated, meaning the lifting assembly will be less sensitive to wind.

According to an embodiment of the invention, the platform is provided with a folding gangway. This gangway ensures a safe way for people to get from the wind turbine to the platform, and vice versa, during maintenance of the wind tower.

According to an embodiment of the invention, the area of the first and second storage areas is at least 4 m². Thus, the first and second storage areas provide enough space for supporting the components.

The object above is also achieved by a method for using the lifting assembly according to the invention for replacing an old component of a wind turbine with a new component as defined in the claims.

The method is characterized in that it comprises the steps of:
 a) positioning the lifting device on the ground and in close proximity to the wind turbine,
 b) lifting the new component by means of the crane and placing the new component on the first storage area of the platform,
 c) moving one of the tower segments to the support frame in a vertical orientation through the opening of the platform by means of the crane,
 d) connecting the tower segment to the support frame,
 e) vertically moving the platform to an upper end of the tower segment,
 f) lifting another of the tower segments, placing the tower segment in a vertical orientation on the previous tower segment by means of the crane, and mechanically connecting the tower segments to each other,
 g) repeating the steps e-f to build the elongated tower,
 h) lifting the top segment and placing the top segment in a vertical orientation on the previous tower segment by means of the crane, and mechanically connecting the tower segments to each other,
 i) connecting the top segment to the wind turbine by means of the securing assembly,
 j) vertically moving the platform to the upper part of the tower segment,
 k) mechanically securing the platform to the top segment,
 l) moving the old component from the wind turbine and placing it on the second storage area by means of the crane,
 m) moving the new component from the platform and placing it on the wind turbine by means of the crane,
 n) moving the old component from the second storage area to the first storage area by means of the crane,
 o) removing the mechanical securing of the platform to the top segment,
 p) vertically moving the platform from the tower segment downwards to the previous tower segment,
 q) disconnecting the tower segments from each other,
 r) moving the tower segment to the ground by means of the crane,
 s) repeating the steps q-s until the platform has been moved to the last tower segment,
 t) moving the platform to the support frame,
 u) disconnecting the last tower segment from the support frame, and v) moving the last tower segment to the ground by means of the crane.

This method for using the lifting assembly according to the invention considerably facilities the replacement of components of a wind turbine. The time and accordingly the costs for providing maintenance on the wind turbine is considerably decreased compared to the prior art methods. A smaller and less costly crane can be used for the replacement of old components. Further, transportation of the lifting assembly to the wind turbine is also facilitated since the parts of the lifting assembly can be transported on ordinary trucks. Suitably, the lifting device is transported as a single assembled unit, meaning only one transporting vehicle is necessary for transporting the lifting device. Since the lifting device can be pre-assembled, the need for an extra lifting assembly for assembling the lifting device at the location of the wind turbine is not necessary, meaning the amount of transport vehicles is further reduced.

The lifting of the new component by means of the crane and the placing of the new component on the first storage area of the platform is performed on the ground. Due to the fact that this is done on the ground, there is no need for using long wires. This means that this part of the method can be performed with less sensitivity to wind. By placing the component on the first storage area, the component will move to the top together with the platform. This means that the component does not have to be transported from the ground to the part of the wind turbine where the component is to be placed by means of the crane. Thus, long wires for transporting the component are not necessary, which makes the assembly less sensitive to wind.

Steps d-i describe the assembling of the tower. Firstly, one of the tower segments is moved to the support frame in a vertical orientation through the opening of the platform by means of the crane. This tower segment is then connected to the support frame and the platform is moved vertically to an upper end of the segment. After this is done, another tower segment is lifted and placed in a vertical orientation on the previous tower segment by means of the crane. The two tower segments are then connected to each other, and the platform is once again moved to an upper end of the newly placed tower segment. These steps are repeated so as to build the tower. Preferably the last tower segments connected is of different heights e.g. 5 m, 3 m or 2 m, so to easily regulate the height of the tower. This is an easy way to assemble the tower, and it is a lot less time consuming than assembling conventional lifting assemblies. Due to the fact that many segments are used, the segments can be produced in sizes that are easy to transport, meaning less means for transportation are needed. Since the amount of segments used for the tower is optional, the height of the tower can also be easily regulated by adding more or less segments while assembling the tower. By being able to regulate the height of the tower, the tower can be optimized so as to easily reach the components of the wind turbine. The tower segments are, preferably, lattice tower segments, meaning that the weight of the segments as well as the wind sensitivity of the tower is reduced due to the fact that the overall surface of the tower is small.

Due to the fact that the tower segments are mounted through the opening of the platform, the platform can easily be moved upwards along the tower to different heights and the platform can also easily be attached to the tower in a stable way, making the platform secure. By connecting the first tower segment to the support frame, and the other tower segments to each other, this ensures the stability of the tower, and prevents the tower segments from being inadvertently disconnected.

The moving of the platform can be done in different ways, for example, by means of a motor and gear wheels arranged in the opening of the platform, wherein the gear wheels can engage with gear racks placed along the tower segments. The motor is able to rotate the gear wheels, making the platform move upwards along the tower segments. This is an easy and time effective way to move the platform to the top of the tower. Due to the fact that the platform is moved after every segment has been placed on top of a previous one, the crane on top of the platform can be used for the lifting all of the different tower components meaning no other lifting assemblies are necessary. This both saves time and decreases the amount of transport vehicles needed.

After all segments but one have been assembled, the last tower segment is assembled on top of the tower. The top segment is assembled in the same way as the other segments. After this is done, the tower is completely assembled. Preferably, the height of the top segment can differ, e.g. 5 m, 3 m or 2 m, which means that the height of the tower is easy to regulate. Suitably, a cap can be placed on the last segment to achieve a top segment, which defines the second storage area. By placing the cap on the last segment, the last segment becomes the top segment.

After the tower has been completed, the top segment is connected to the wind turbine by means of the securing assembly. This makes the tower more stable and more wind resistant, since the securing assembly will ensure that the resulting forces from, for instance, wind, will be counteracted by the wind turbine. By making the tower more stable, the safety of the people working on and near the wind turbine is increased, since the probability of the tower, e.g., falling or breaking is decreased. Suitably, different tower segments are also connected to the wind turbine be means of securing assemblies during the assembly of the tower. This increases the safety and stability of the tower during its assembly, as well as increases the stability of the fully assembled tower.

Once the security assembly has connected the tower to the wind turbine, the platform is vertically moved to the upper part of the top segment and is then mechanically secured to the top segment. After this, the lifting assembly is completed. By moving the platform to the upper part of the top segment, the platform is at its highest point. This means that the crane is able to easily reach and replace the components of the wind turbine that needs replacing without the need for long wires. By mechanically connecting the platform to the top segment, the unbalanced weight of the objects on the platform that arises when the crane needs to move different objects to and from the platform will not wear on the drive unit. If the platform would not be mechanically connected to the tower, but only being held up by the drive unit, the drive unit would be worn out faster due to the large forces the drive unit would be subjected to because of the imbalanced weight.

After the lifting assembly has been completed, the old component is moved from the wind turbine and placed on the second storage area by means of the crane. Since the crane is placed on the platform, and the platform has been moved to the upper part of the tower, and the tower is built to the required height, the crane can easily reach the old component on the wind turbine and place it on the second storage area without having to use long wires, making this solution less sensitive to wind. By placing the old component on the second storage area, this component will be transported to the ground along with the platform, and not by using long wires to directly transport it to the ground. This also makes this solution less sensitive to wind. Also, by placing the old component on the second storage area, the weight balance of the platform remains intact.

Once the old component has been placed on the second storage area, the new component is then moved from the platform and is placed on the wind turbine by means of the crane. Again, since the platform with the crane has been moved to the top of the tower, which has been built to the required height, the crane can easily reach the part of the wind turbine where the new component is to be placed. When using cranes most commonly used today, the new component needs to be collected from the ground, meaning long and wind sensitive wires are required. By using this lifting assembly, the need for long wires is no longer necessary when placing the new component on the wind turbine, making it less sensitive to wind.

Once the new component has been placed on the wind turbine, the old component is moved from the second storage area to the first storage area by means of the crane. This can, once again, be done by the crane without the use of long wires, making it less sensitive to wind. By moving the old component to the first storage area, the weight balance is intact on the platform, since the weight of the old component is a counterweight to the objects on the other side of the platform, e.g. the crane and the power generation device. Because of this, the disassembly of the tower will be made a lot easier, since the drive unit will not be as worn out as it would have been if the platform was not balanced.

Once the old component has been moved to the first storage area the mechanical securing fixedly connecting the platform to the tower is removed after this the disassembly of the tower can begin. The disassembly of the tower starts with vertically moving the platform from the top segment downwards to the previous tower segment. After that, the tower segments are disconnected from each other and the segments are then moved to the ground by means of the crane. By using the crane, there is no need for an extra lifting assembly for the disassembling of the tower. These steps are then repeated until only the last tower segment remains. In comparison to other lifting assemblies, this way of disassembling the tower is very simple and time effective.

Once all but one tower segment has been removed, the platform is moved to the support frame. After this is done, the last tower segment can then be disconnected from the support frame and moved to the ground by means of the crane. By doing this, the disassembly of the tower is complete. Since the moving of the last segment is done by the crane, there is, once again, no need for long wires, making this part of the disassembly of the tower less sensitive to wind. By moving the last tower segment to the ground, only the lifting device remains, which can then easily be transported as one unit by a single vehicle from the location of the wind turbine, meaning that the amount of transport vehicles are reduced.

According to an embodiment of the method, said component is any of a gear box, a generator, and a wind turbine wing. These are the most common components on a wind turbine that require maintenance.

According to an embodiment of the invention, the method further comprises starting the power generation device before step b. This means that the power generation device will be started before the new component is lifted by means of the crane and placed on the first storage area of the platform. By performing this step, the power generation device will provide the crane with the necessary power needed for the lifting of components and the tower segments. The power generation device will also provide power to the drive unit, which will allow the gear wheels on the platform to rotate. Since said gear wheels engage with the gear racks, the rotating of the gear wheels will enable the platform to move, either upwards or downwards, depending on the direction of which the gear wheels are turning.

According to an embodiment of the invention, the method further comprises the following steps: removing the roof of the wind turbine and placing it on the protruding extendable beams on the platform before performing step l, and lifting the roof back onto the wind turbine before step o.

BRIEF DESCRIPTION OF THE DRAWINGS

The invention will now be explained more closely by the description of different embodiments of the invention and with reference to the appended figures.

FIG. 6 shows the platform bearing on the support frame as seen from above.

DETAILED DESCRIPTION

Figure 1:
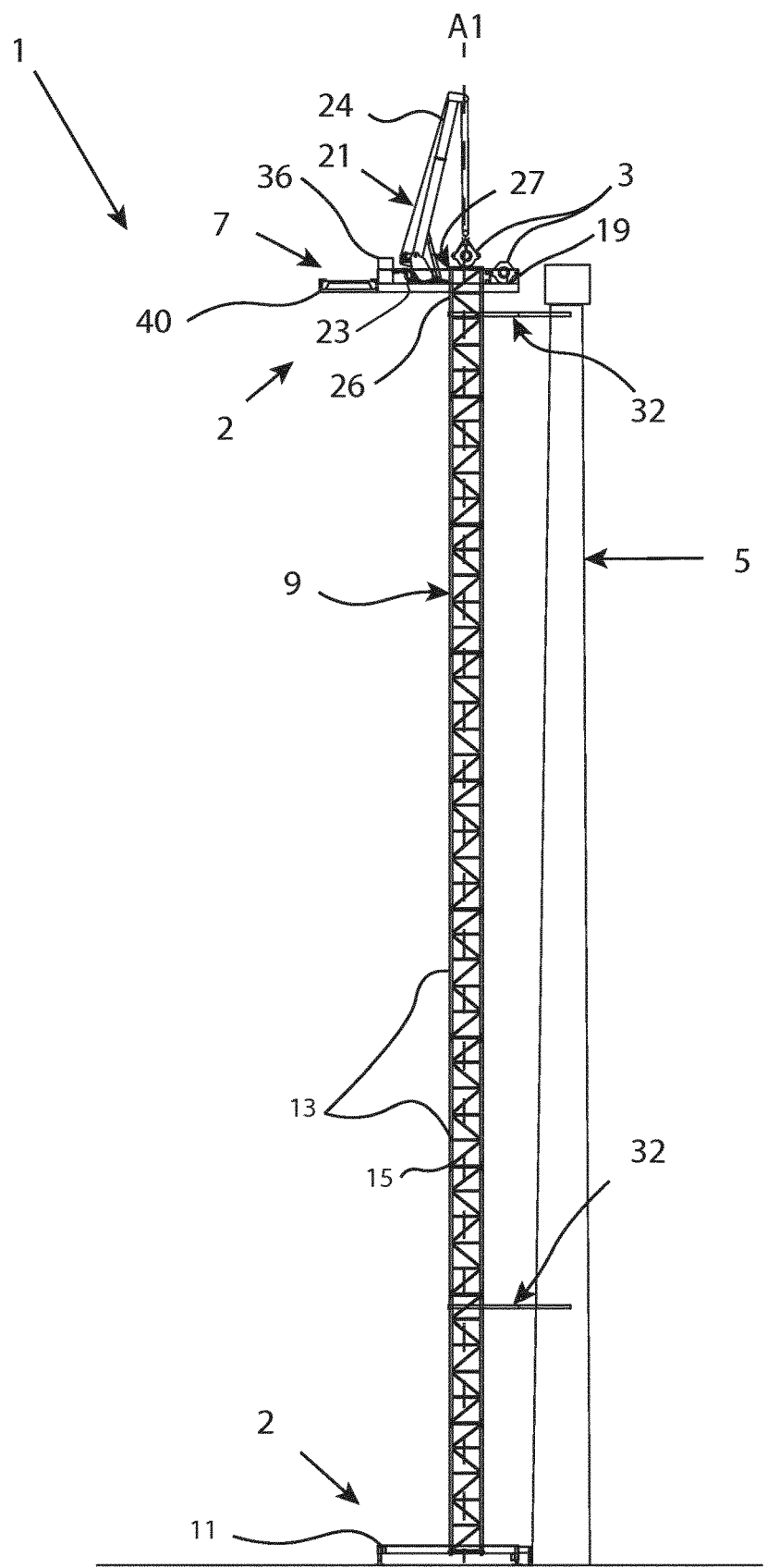
FIG. 1 shows a lifting assembly for elevating components to a wind turbine.

FIG. 1 shows a lifting assembly 1 for elevating components 3 to a wind turbine 5. The lifting assembly 1 is arranged in close proximity to the wind turbine 5. The lifting assembly 1 comprises a plurality of tower segments 13 which together form an elongated tower 9 with an adjustable height. The lifting assembly 1 further comprises a lifting device 2 including a support frame 11 for supporting the tower, a securing assembly 32 for securing the tower 9 to the wind turbine, a platform 7 arranged linearly moveable relative the support frame 11 and a crane 21 disposed on the platform. The platform 7 is arranged above the support frame 11. The platform is vertically movable in relation to the support frame 11. In this embodiment of the invention, the platform is also linearly moveable relative the tower 9 in a vertical orientation. The platform has a first storage area 19 for supporting components weighing more than 10 tons. The support frame 11 is arranged on the ground and is adapted to support the elongated tower 9.

The tower is adapted to extend along its longitudinal axis A1 to a height substantially corresponding to the height of the wind turbine 5. The tower 9 is made up of a plurality of smaller tower segments 13 arranged on top of each other and connected to each other so to achieve the necessary height of the tower 9. The tower segments 13 are connected to each other with attachment means 15, e.g. bolts. The height of the tower segments can differ but is preferably of a height facilitating transport of the tower segments. Since the height of the tower 9 should substantially correspond to the height of the wind turbine 5, tower segments 13 of various heights could be needed to achieve the necessary height of the tower 9. One of the tower segments 13 is a top segment 26. The top segment 26 has an upper part 27 provided with a second storage area 28 for supporting components 3 with a weight of more than 10 ton. The top segment 26 is adapted to be arranged as the uppermost tower segment 13.

The lifting device 2 comprises a securing assembly adapted to fixedly connect the tower 9 to the wind turbine 5 so to prevent the tower from swaying. The securing assembly 32 may comprises a plurality of securing devices 32 configured to clamp the tower of the wind turbine.

Figure 2:
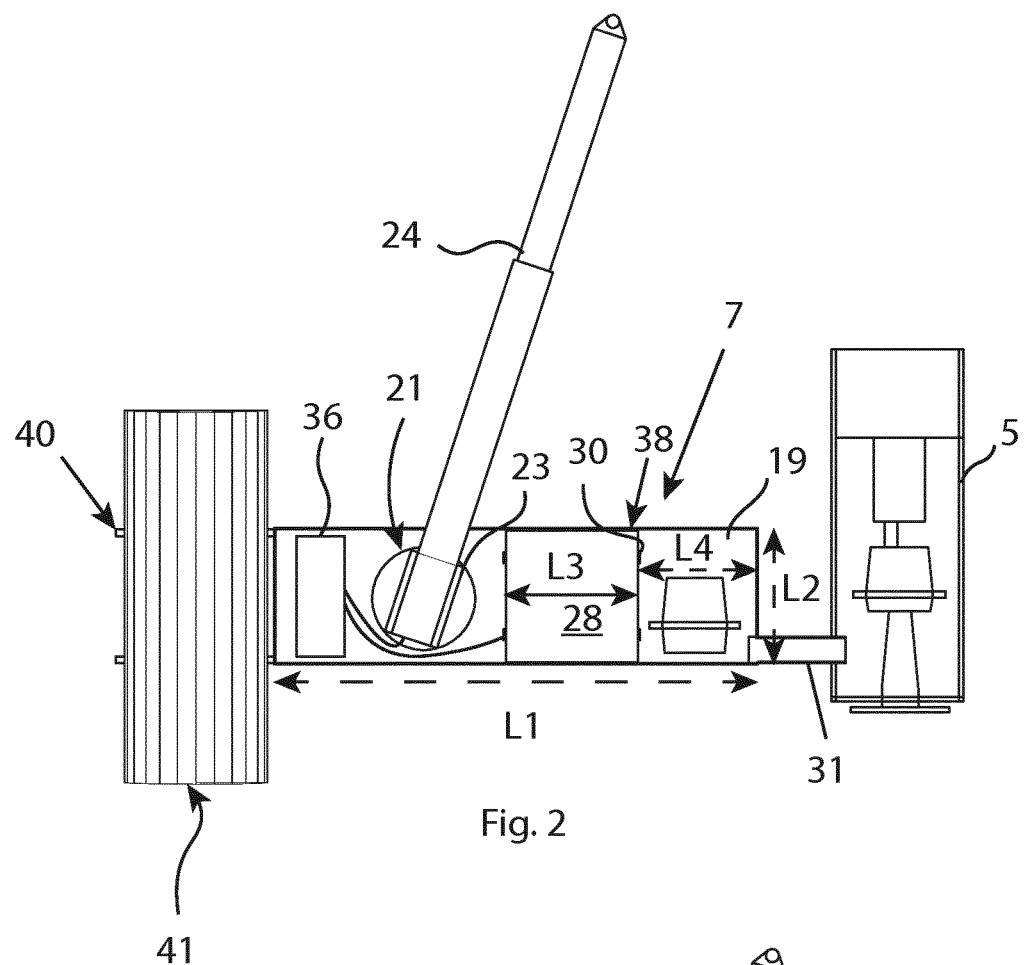
FIG. 2 shows the lifting assembly and the wind turbine in a view from above.

FIG. 2 shows the lifting assembly 1 and the wind turbine in a view from above when the platform is in an upper position. Preferably, the platform 7 has a length L1 of at least 4 m and a width L2 of at least 2 m. In this embodiment the platform has a length L1 of more than 6 m and a width L2 extending perpendicular to the length L1 of more than 3 m. The platform 7 comprises securing means (not shown) adapted to mechanically connect the platform to the top segment 26 in the upper position so the platform 7 becomes fixed to the top segment 26. The securing means can be any suitable arrangement for removably attaching the platform to the top segment, for example, locking pins.

In the embodiment shown in FIG. 2, the lifting device comprises a folding gangway 31, adapted to be arranged between the platform 7 and the wind turbine 5 for providing safe passage for people between the platform and the wind turbine.

Figure 3:
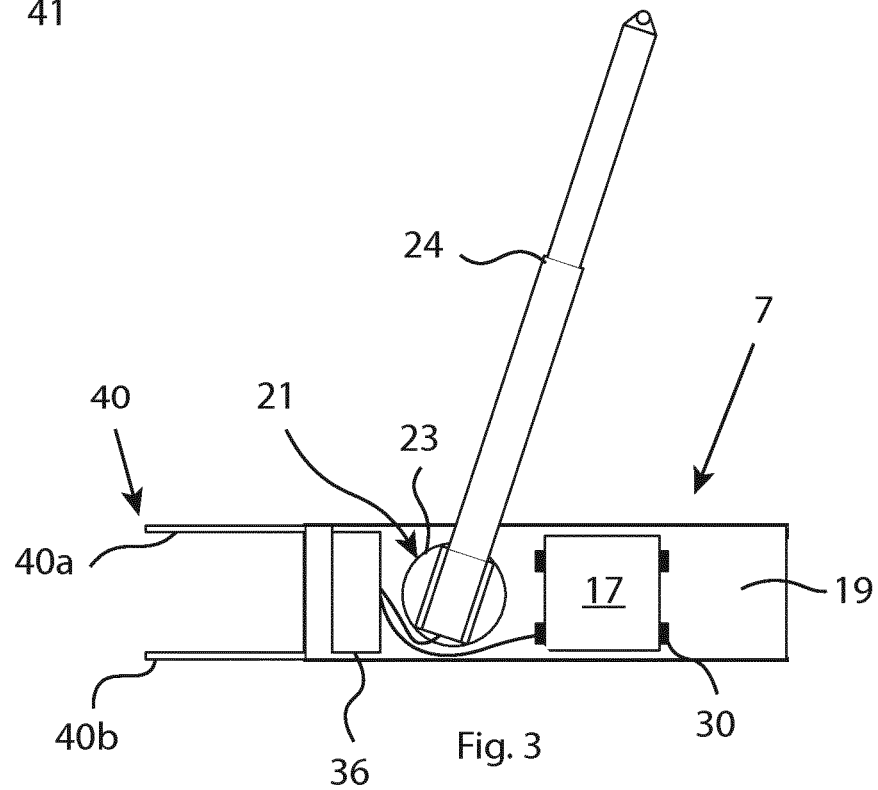
FIG. 3 shows the platform from above as seen without an elongated tower.

FIG. 3 shows an example of the platform 7 in a view from above and seen without the elongated tower 9. The platform 7 is provided with an opening 17 adapted to receive the tower segments 13, as shown in FIG. 3. The size and shape of the opening 17 substantially correspond to the size and shape of the cross-section of the tower segments 13 so that the tower segments fit in the opening and to allow the tower segments to penetrate through the opening. The crane 21 and the first storage area 19 are arranged on opposite sides of the opening 17. In this embodiment, the crane 21 is arranged farther from the wind turbine 5 than the first storage area 19. In other embodiments the crane 21 can be arranged closer to the wind turbine than the first storage area and on a different side of the opening 17. The opening 17 surrounds the periphery of the tower 9 so that the platform 7 protrudes in different horizontal directions from the tower 9.

The crane 21 has preferably a weight of more than 10 ton and less 40 ton and most preferably a weight less than 30 ton. The crane 21 comprises a base part 23 connected to the platform 7 and a jib 24 rotatably connected to the base part 23. The jib 24 is adapted to lift and move the components 3 to and from the platform 7. The jib has preferably a maximum length of less than 40 m, and most preferably the jib 24 has a maximum length of less than 30 m. The lower position corresponds to the position of the platform 7 relative the tower 9 in which the platform 7 is bearing on the support frame 11. The upper position is a position at a distance above the support frame and may correspond to the highest position the platform can be moved to relative the tower, and a position in which the components 3 can be moved from the platform 7 to the upper part of the wind turbine 5. The crane 21 is configured to move the components 3 between the platform 7 and the wind turbine 5 when the platform 7 is in the upper position and preferably between the ground and the platform 7 when the platform is in the lower position.

The platform 7 is arranged movable relative the tower 9 between an upper position and a lower position by means of one or more drive units 30. The drive units 30 are disposed in close vicinity to the opening 17 of the platform. The tower segments 13 are provided with one or more drive devices, such as gear racks (not shown), adapted to cooperate with the drive units 30 in order to move the platform relative the tower segments. In this embodiment, the platform is provided with four drive units 30 and the tower segments are provided with four drive devices. The drive unit 30 may comprise a motor, a gear box and a drive mechanism (not shown) including one or more drive elements, such as gear wheels, adapted to engage to the drive devices provided on the tower segments 13 in order to move the platform 7 between the upper and lower positions. Preferably the motor is an electric motor, and the driving mechanism comprises at least one gearwheel and the drive device comprises at least one gear rack.

In this embodiment, the drive unit 30 is powered by a power generation device 36 configured to generate electric power to the drive unit by means of cables. The power generation device 36 is also configured to generate electric power to the crane 21. Thus, the crane 21 and the drive are powered by the power generation device 36. In this embodiment, the power generation device is arranged at the same side relative the opening 17 as the crane 21. In other embodiment, the power generation device 36 can be arranged at the same side of the opening 17 as the first storage area 19. Alternatively, the crane 21 and the drive units 30 can also be coupled to the electrical system of the wind turbine 5 and receive electrical power directly from the wind turbine, thus no power generation device is necessary.

In this embodiment, the top segment 26 comprises a cap 38 covering the upper part 27 of the top segment and removably attached to the upper part 27, as shown in FIG. 2. Preferably, the upper part 27 of the top segment is protruding from the opening 17 so that the cap 38 is arranged above the opening 17 when the platform is in the upper position. The cap 38 has an upper surface defining the second storage area 28. The opening 17 and the periphery of the cap 38 and tower segments 13 are of the same shape e.g. rectangular. Rectangular shapes are easy to produce and rectangular tower segments 13 are easily stacked, which makes e.g. transportation easier. The cap 38 has a width L3 extending perpendicular to the longitudinal axis A1 of the tower 9, and the width of the cap 38 at its widest part is preferably equally large or larger than the width of the opening 17. The area of each of the first and second storage area 19, 28 is preferably at least 4 $m^2$. Each of the sides L3 of the cape is preferably longer than 2 m in order to provide room enough for the components. The cap 38 is preferably made out of steel or some kind of metal, but could also be made of any kind of high strength material such as carbon fiber.

In this embodiment, the platform 7 is provided with extendable beams 40 adapted to support a wind turbine roof 41, as shown in FIG. 3. The extendable beams 40 are connected to the platform 7 and comprises a first and a second beam 40a-40b arranged at a distance from each other and the beams protrude parallel to each other a distance from the platform 7. The beams are adapted to temporarily support the wind turbine roof 41.

The maneuver of the crane and the platform can be done in a wireless manner. Using wireless control means increases the safety of the lifting assembly since no personal needs to be positioned on the platform, while the crane and the platform is operating.

Figure 4:
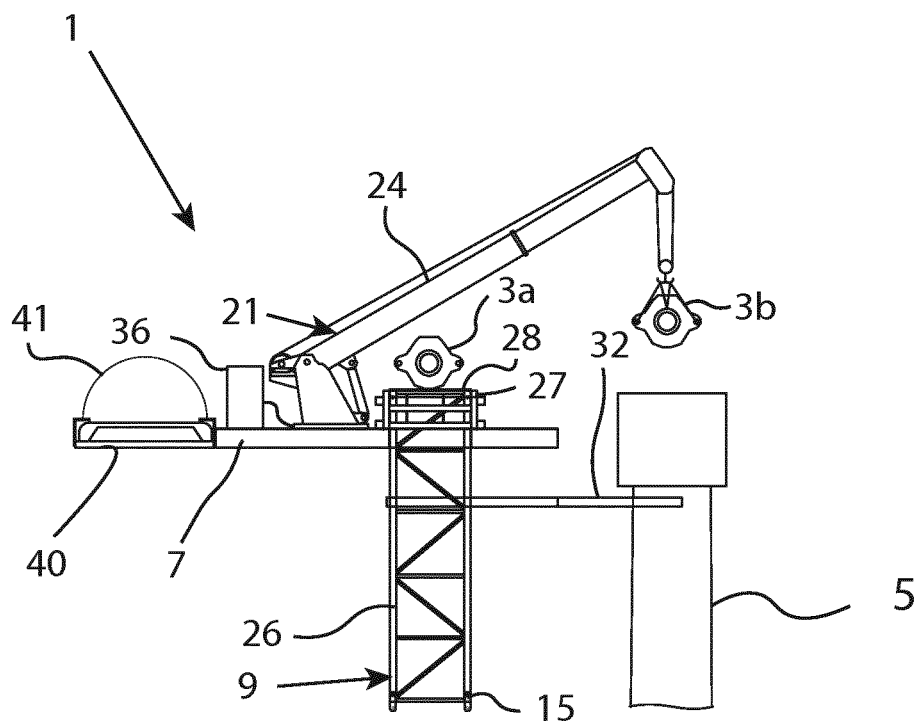
FIG. 4 shows a crane switching an old component for a new component.

FIG. 4 shows the upper part of the lifting assembly when the platform 7 is in the upper position. The top segment 26 is penetrating through the opening 17 of the platform 7. The upper part 27 of the top segment including the cap is slightly protruding from the platform so that the second storage area 28 can be reached from the platform. The second storage area 28 is disposed on top of the tower 9 and by that is supported by the tower. FIG. 4 shows the crane 21 switching an old component 3a for a new component 3b in the wind turbine 5. The old component 3a has temporarily been placed in the second storage area 28 and the new component 3b has been lifted from the first storage area 19 by means of the crane 21 before being placed into the wind turbine 5. In this embodiment the platform 7 comprises a reinforced cage 43. The cage is made up of a plurality of beams preferably made out of steel. The cage comprises the drive unit 30. In this embodiment, the driving mechanism (not shown) comprises a plurality of gearwheels (not shown) extending inwards from the cage and adapted to engage to fixed gear racks (not shown) on the tower segments. The cage 43 is adapted to surround the tower 9 and by means of the driving mechanism support the platform 7 to the tower.

Figure 5:
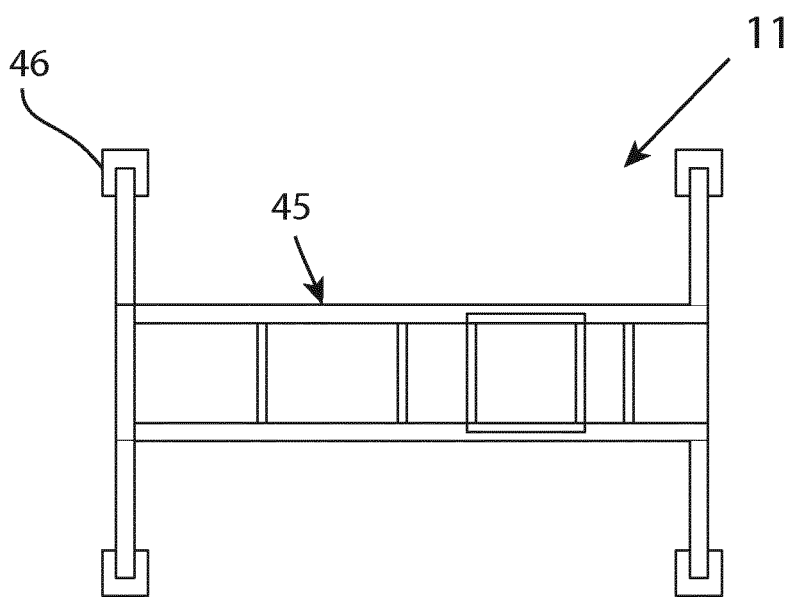
FIG. 5 shows the support frame as seen from above.

FIG. 5 shows the support frame 11 as seen from above. The support frame 11 comprises a body 45, support legs 46 extending perpendicular to the body 45 and adapted to bear on the ground and support the body. The body comprises connection means (not shown) for fixedly connecting the tower to the support frame. The support frame 11 further comprises means for removably attach the platform 7 to the body 45. The platform 7 is adapted to bear on an upper surface of the body when the lifting device 2 is not in use as seen in FIG. 6.

Figure 6:
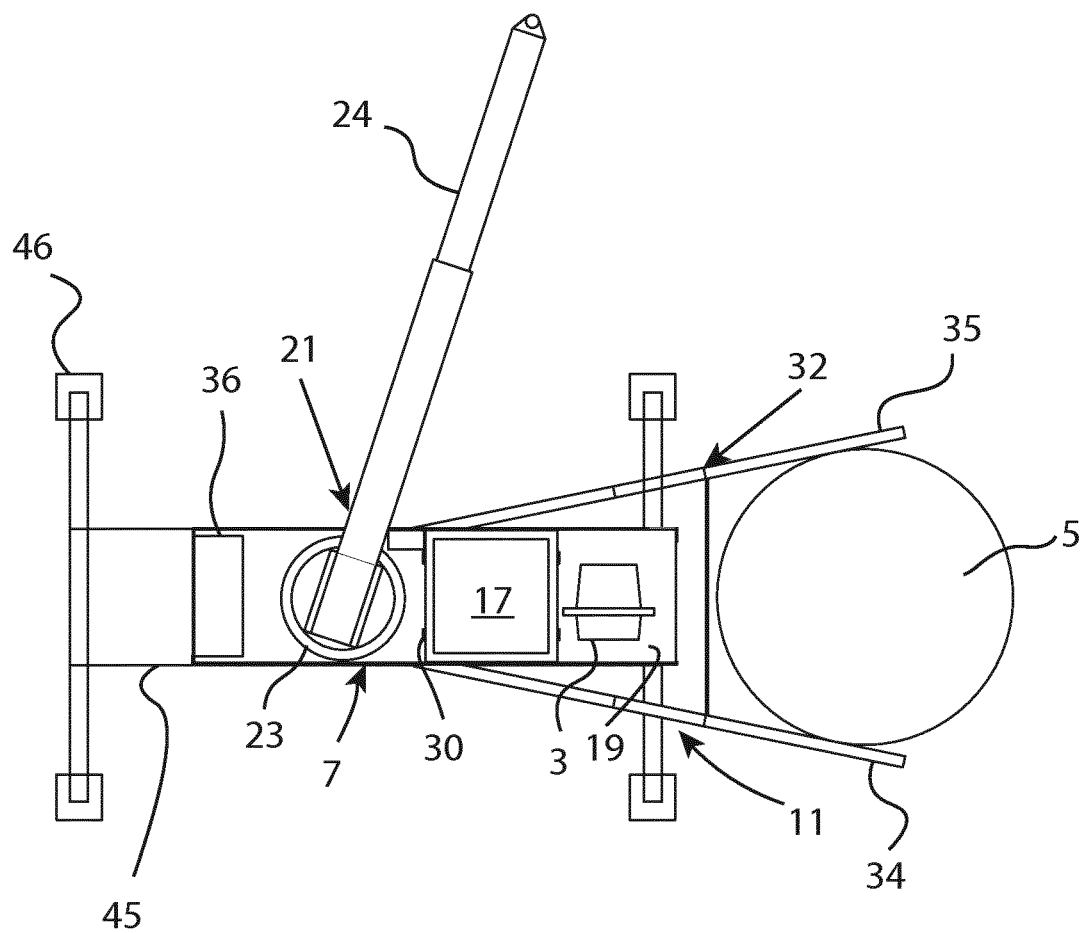
FIG. 6 shows the platform bearing on the support frame.

FIG. 6 shows the lifting assembly and the wind turbine from above. The lifting assembly comprises a securing assembly 32 adapted to fixedly connect the tower 9 to the wind turbine 5 so to prevent the tower from swaying. In this embodiment, the securing assembly 32 comprises two clamping parts. Each clamping part comprises two clamping rods 34, 35 adapted to extend perpendicular relative the tower 9 and around a part of the periphery of the wind turbine 5. The clamping rods 34, 35 are pressed against the tower 9 by means of a clamping mechanism (not shown) thus fixedly connecting the tower 9 to the wind turbine 5.

Figure 7:
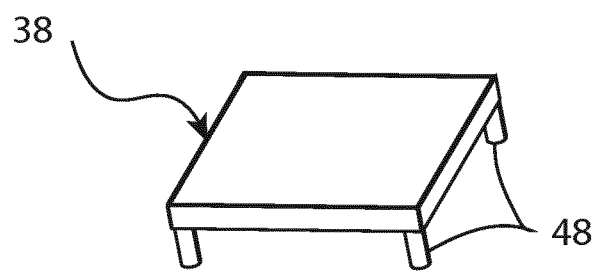
FIG. 7 shows a cap as seen in a perspective view.

FIG. 7 shows the cap 38 as seen in a perspective view. The cap comprises a plurality of connection bars 48 protruding from the cap. The connection bars are adapted to connect the cap to the top segment 26 by engaging in through holes (not shown) of the upper part 27 of the top segment.

A method for using the lifting assembly to replace an old component with a new one is described herein with reference to FIGS. 8-14.

Figure 8:
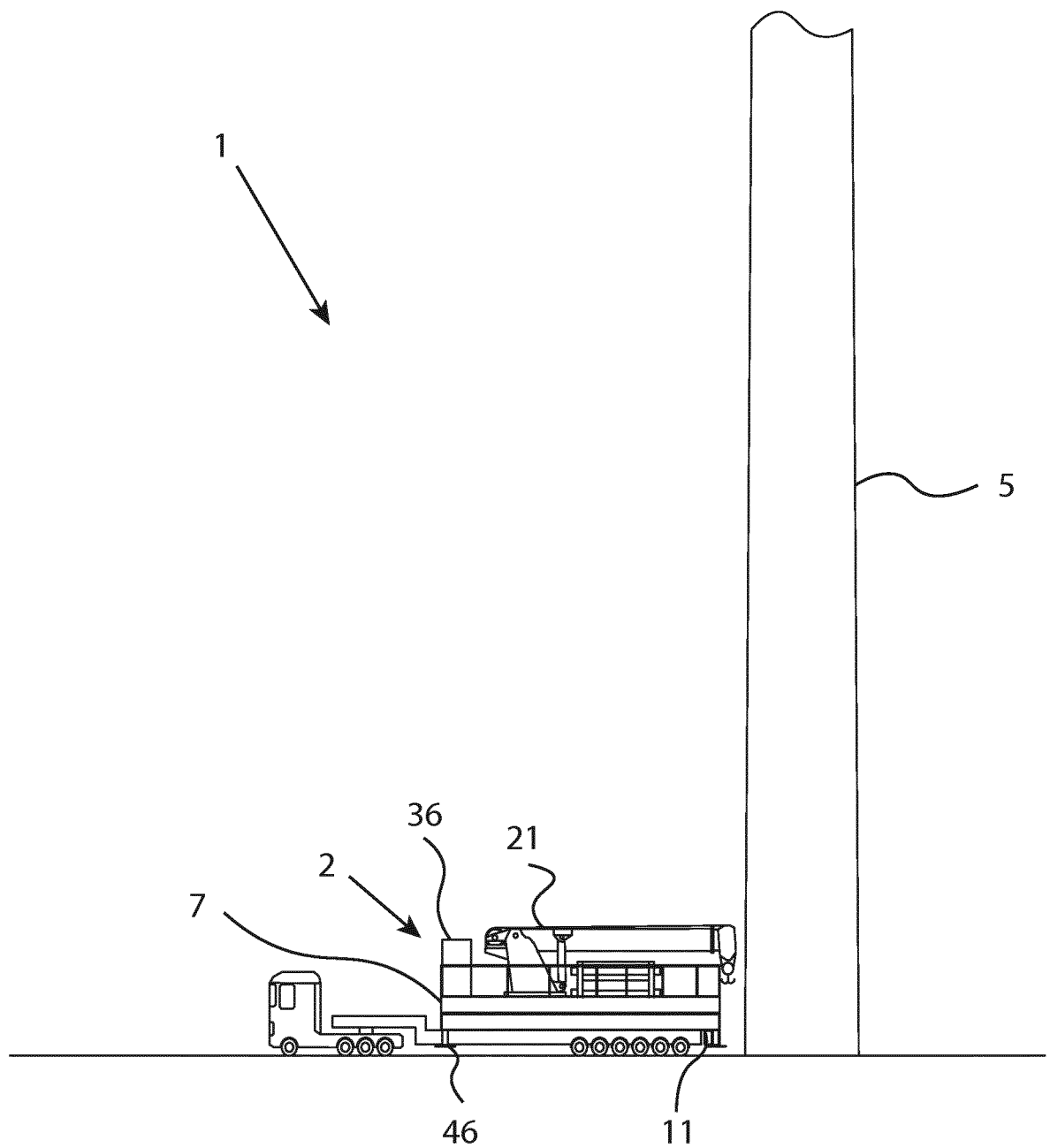
FIG. 8 shows a transportation vehicle positioning the lifting device in close proximity to the wind turbine.

FIG. 8 shows a transportation vehicle transporting the lifting device 2 as it is positioning the lifting device in close proximity to the wind turbine 5. Suitably, the lifting device 2 is pre-assembled before it is loaded on the transportation vehicle, e.g. a truck, meaning no assembly of the lifting device 2 is required at the location of the wind turbine 5. This also means that only one transportation vehicle is required for the transport of the lifting device 2, which decreases the total amount of transport vehicles. The transportation vehicle lowers the support legs 46 in order to place the lifting device 2 on the ground and drives away once the lifting device 2 is positioned. Since the transportation vehicle directly places the lifting device 2 in the correct position, there is no need for e.g. an extra lifting assembly for the positioning of the lifting device 2. Once the lifting device 2 is positioned, the power generation device 36, e.g. a diesel generator, which is configured to generate electric power to the drive unit 30, is started. Since the power generation device 36 is arranged on the platform 7, there will be no need for long cords, which there would have been if the power generation device 36 had been arranged, for example, on the ground.

Figure 9:
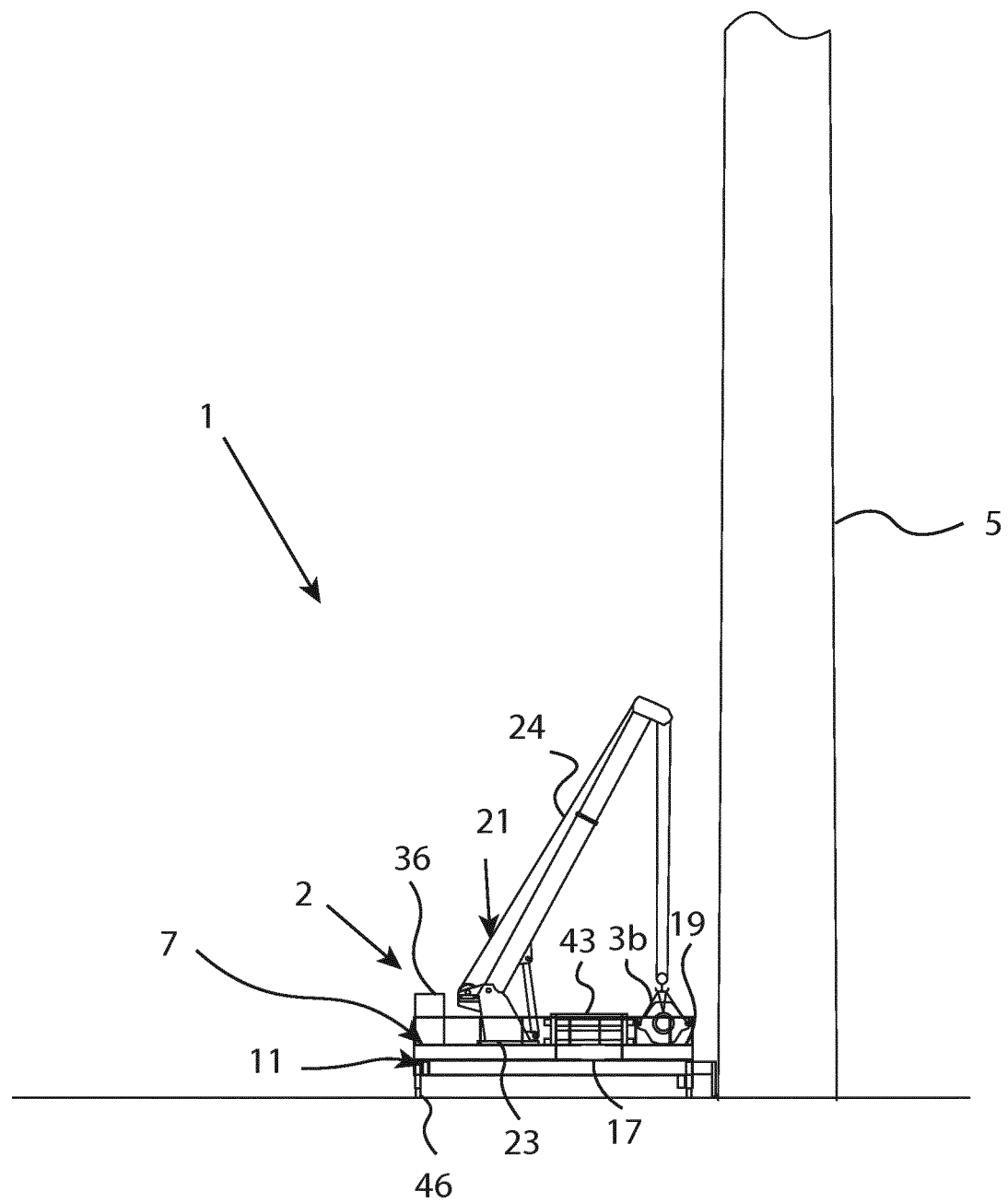
FIG. 9 shows a new component as it is lifted from the ground by means of the crane as seen in a side view.

In FIG. 9, the new component 3b is lifted from the ground by means of the crane 21 and is placed on the first storage area 19 of the platform 7. By only having to lift the component 3 the distance from the ground to the platform 7, the crane does not need to use long wires to accomplish this. Long wires are sensitive to wind since they might start to swing while lifting objects. This means that by lifting the component 3 onto the platform 7, instead of e.g. having to lift it directly from the ground to the wind turbine 5, this solution becomes less sensitive to wind, which means there will be less stoppage of production. The component 3 can, for instance, be any of a gear box, a generator, and a wind turbine wing. These components 3 are the most common components of a wind turbine 5 needing replacing.

Figure 10:
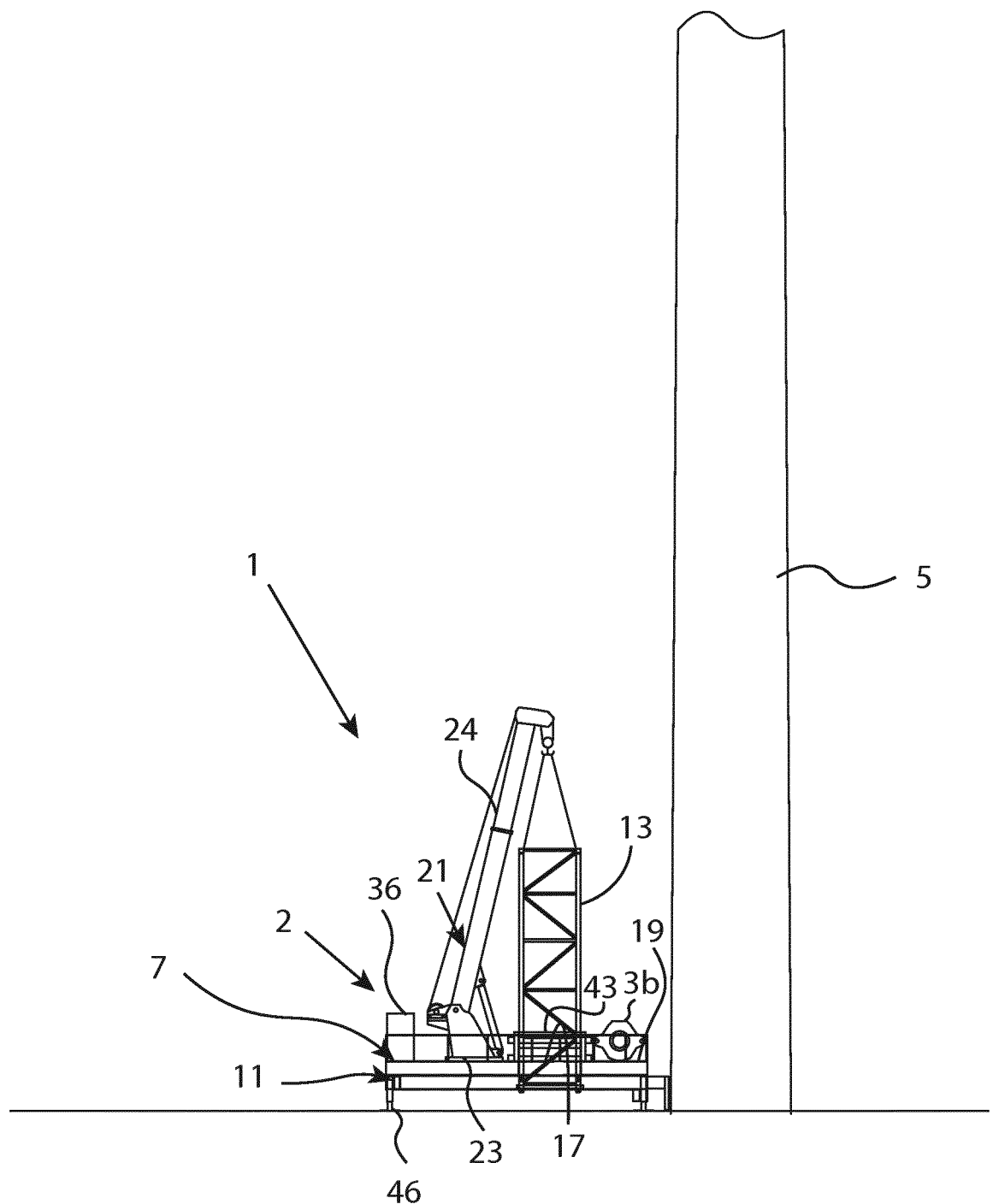
FIG. 10 shows a tower segment being lifted from the ground and moved to the support frame.

In FIG. 10, one of the tower segments 13 is lifted from the ground and moved to the support frame 11 in a vertical orientation through the opening 17 of the platform 7 by means of the crane 21. By producing the opening 17 and the periphery of the tower segments 13 in the same shape, the tower segments 13 can easily be placed through the opening 17 while the tower 9 is built and the platform 7 can easily be moved upwards along the tower 9 by means of the drive unit 30. The tower segment 13 is connected mechanically to the support frame 11 by the use of the connection means, e.g. bolts. In doing so, the lifting assembly 1 becomes more stable.

Figure 11:
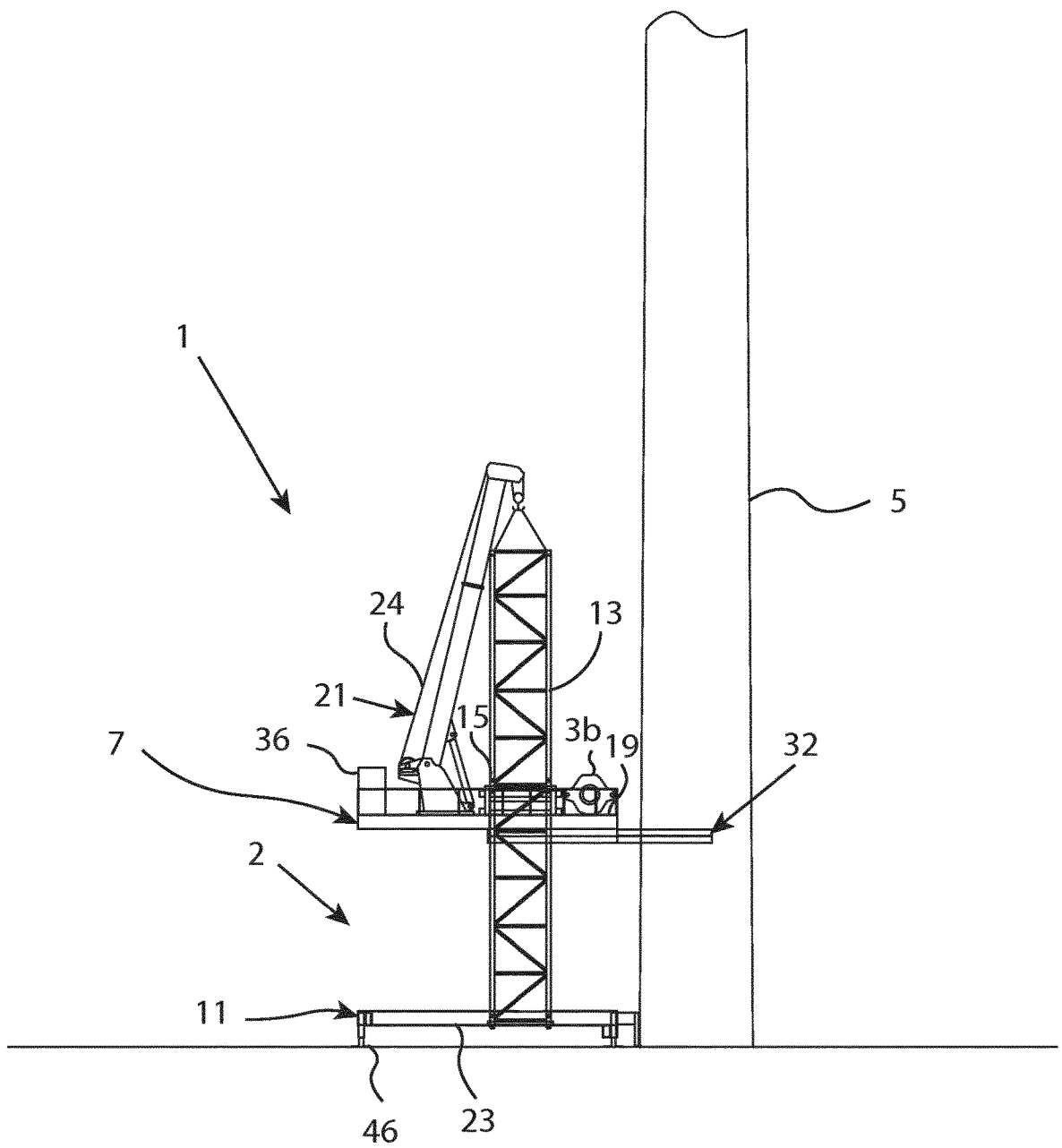
FIG. 11 shows another tower segment being lifted from the ground and placed on the previous tower segment.

In FIG. 11, the platform 7 has been moved vertically to an upper end of the tower segment 13, by means of the drive unit 30 as seen in FIGS. 3 and 6. During the moving of the platform 7, it is important to have the weight of the platform 7 balanced so as to not wear out the drive unit 30. By having the crane 21 and the power generation device 36 placed on one side of the platform 7 and the new component 3b placed on the other, these weights cancel each other out, meaning that the platform 7 becomes balanced.

Another tower segment 13 has been lifted from the ground and placed in a vertical orientation on the previous tower segment 13 by means of the crane 21, which is also shown in FIG. 10. The two tower segments 13 are mechanically connected to each other by using attachment means 15, e.g. bolts, making the lifting assembly 1 more stable. The platform 7 is once again moved vertically by means of the drive unit 30 to an upper end of the newly placed tower segment 13. A new tower segment 13 is then moved from the ground and placed on the previous one by means of the crane 21. These steps are then repeated so as to build the elongated tower 9 as seen in FIG. 1. When the approximate required height of the tower 9 is reached and only one tower segment remains, i.e. the top segment 26, these steps are no longer performed. This in an easy way to assemble the tower 9, and it is a lot less time consuming than assembling conventional lifting assemblies. Due to the fact that many tower segments 13 are used, the tower segments 13 can be produced in sizes that are easy to transport, meaning less means for transportation are needed. Since the amount of tower segments 13 used for the tower 9 is optional, the height of the tower 9 can also be easily regulated by adding more or less tower segments 13. By being able to regulate the height of the tower 9 it can be optimized so as to easily reach the components 3 of the wind turbine 5. The tower 9 is, preferably, a lattice tower, meaning that the weight of the tower segments 13 as well as the wind sensitivity of the tower 9 is reduced due to the fact that the overall surface of the tower 9 is small.

Figure 12:
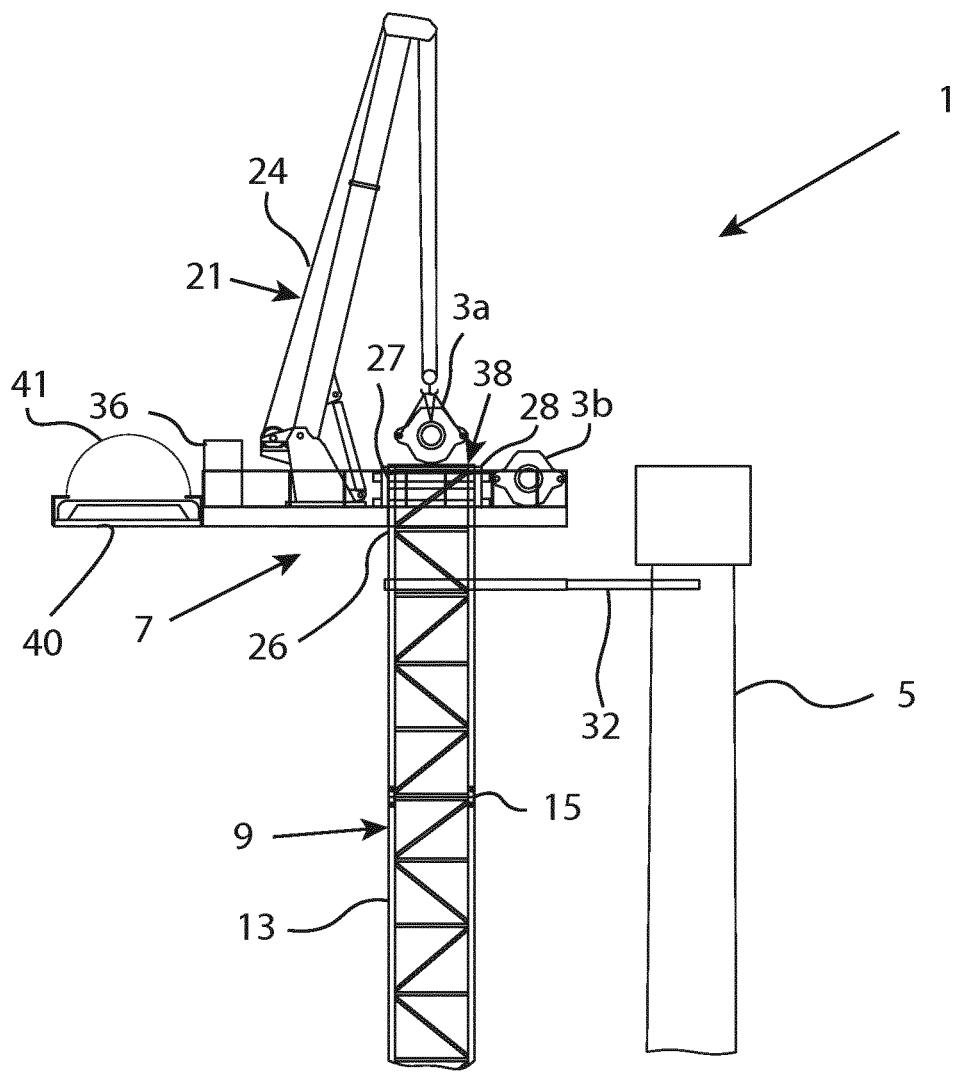
FIG. 12 shows a zoomed in side view of the lifting device when the tower has been fully assembled and the platform is in an upper position and the crane is placing an old component on a second storage area.

In FIG. 12 the tower has been assembled. The top segment 26 has been lifted and placed in a vertical direction on the previous tower segment 13 by means of the crane 21, and the two tower segments are mechanically connected to each other. Again, the connecting of the tower segments 13 is done by using the attachment means 15, which makes the lifting assembly 1 more stable. The periphery of the top segment 26 is of the same size and shape as the rest of the tower segments 13, but the length of the top segment 26 can vary, meaning that the height of the tower 9 is easy to regulate. The height of the other tower segments 13 can also vary, thus further facilitating the regulation of the height of the tower 9.

The top segment 26 is connected to the wind turbine 5 by means of the securing assembly 32, which is shown in FIG. 11. This provides extra stability of the lifting assembly 1 and makes it more resistant to wind, since the securing assembly 32 will ensure that the resulting forces from, for instance, wind, will be counteracted by the wind turbine 5. By making the tower 9 more stable, the safety of the people working on and near the wind turbine 5 is increased, since the probability of the tower 9, e.g., falling or breaking is decreased.

The platform 7 is vertically moved by means of the drive unit 30 to the upper part 27 of the top segment 26 and is then mechanically secured to the top segment 26. The securing of the platform 7 to the top segment 26 can be done by using the securing means, and in doing so, the drive unit 30 no longer has to support the platform 7. This means that if the weight on the platform 7 becomes imbalanced, this will not affect the drive unit 30 and therefore the imbalance will not wear on the drive unit 30. After this, the elongated tower 9 is completed. Once the platform 7 is at the upper part 27 of the top segment 26, the crane 21 will be as close as it can be to the old component 3a on the wind turbine 5 that needs to be replaced. In this embodiment the top segment 26 has been provided beforehand with the cap 38, which is removably attached to the upper part 27 and has the surface defining the second storage area 28. The cap 38 is of the same shape as the opening 17 and the periphery of the tower segments 13 is in this embodiment rectangular, and is preferably the same size as the periphery of the top tower segment 26.

Suitably, the protruding extendable beams 40 are extended once the elongated tower 9 has been built, and the wind turbine roof 41 is removed from the wind turbine 5 and placed on said beams 40 by means of the crane 21. By removing the wind turbine roof 41, the components 3 inside the wind turbine 5 will be replaceable. Preferably, the folding gangway 31 is placed with one end on the platform 7 and an opposite end on the wind turbine 5. By adding this folding gangway 31, there is an easy and safe way for people to get between the wind turbine 5 and the platform 7, which might be necessary during the replacing of the old component 3a. This set-up can be seen in FIG. 2.

FIG. 12 also shows the old component 3a being moved from the wind turbine 5 and placed on the second storage area 28 by means of the crane 21.

Figure 13:
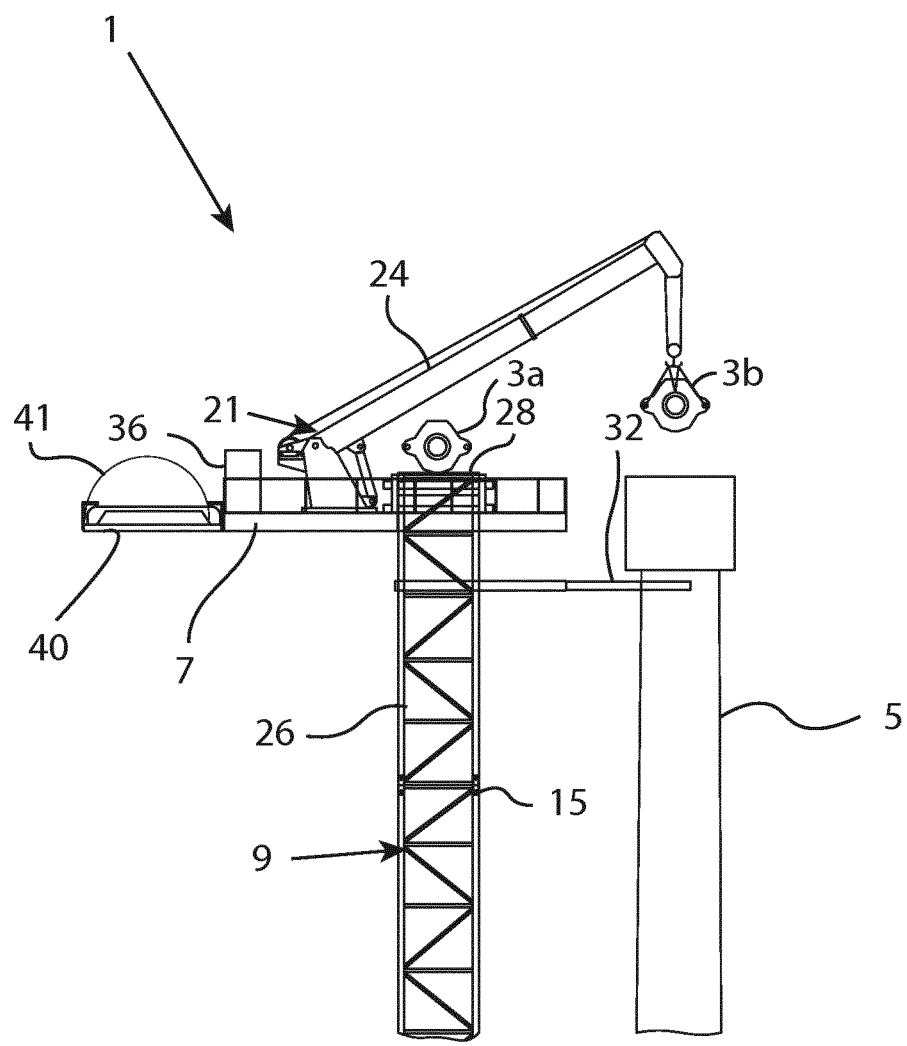
FIG. 13 shows the lifting device and the tower from the same view as in FIG. 12 but with the crane placing a new component in the wind turbine.

In FIG. 13, the new component 3b is moved from the platform 7 and placed on the wind turbine 5 by means of the crane 21.

Figure 14:
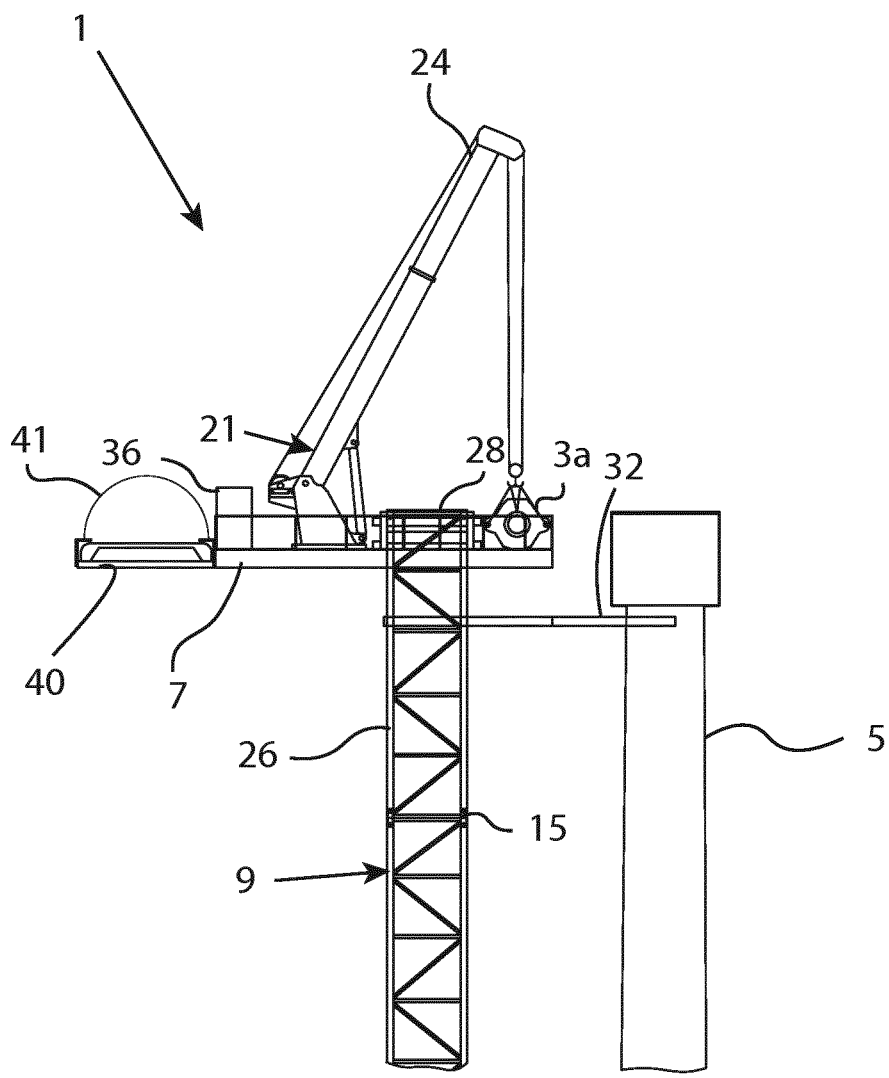
FIG. 14 shows the lifting device and the tower from the same view as in FIG. 12 but with the crane placing the old component on a first storage area.

In FIG. 14, the old component 3a is moved from the second storage area 28 to the first storage area 19 by means of the crane 21. By performing these steps, the replacing of the old component 3a is completed. Due to the fact that the crane 21 is arranged on the platform 7, which has been moved as close as possible to the wind turbine 5, the distances when moving the components 3 to their different locations are all very short, which means that the moving of the components 3 can be performed without the need for long wires. This is an easier and less wind sensitive solution for replacing the old component 3a, in comparison to other lifting assemblies where all components need to be transported to and from the ground using long wires. By placing the old component 3a on the second storage area 28, the weight balance of the platform 7 remains intact. By moving the old component 3a from the second storage area 28 to the first storage area 19 after the new component 3b has been placed on the wind turbine 5, the weight balance will once again be intact. This is because the weight of the old component 3a will replace the new component 3b as a counterweight to the objects on the other side of the platform 7, e.g. the crane 21 and the power generation device 36. Because of this, the drive unit 30 will not be as worn out during the disassembly of the tower 9, as it would have been if the platform 7 was imbalanced.

Once the old component 3a has been replaced with the new component 3b, the disassembly of the tower 9 can begin. The folding gangway 31 is removed from the wind turbine 5 and is placed on the platform 7. The wind turbine roof 41 is placed back on the wind turbine 5. This needs to be done since. The extendable beams 40 are then retracted. This can be done any time after the roof 41 has been replaced, but suitably, it is done before the platform 7 has been brought down to the support frame 11, since it is easier to retract the beams 40 if they are not directly placed on a surface, but are, at least, slightly elevated.

The mechanical securing of the platform 7 to the top segment 26 is removed, which enables the platform 7 to become vertically movable from the top segment 26 downwards to the previous tower segment 13 by means of the drive unit 30. The tower segments are disconnected from each other and the tower segment 13 is moved to the ground be means of the crane 21. By using the crane 21, there is no need for an extra lifting assembly for the disassembling of the tower 9, which simplifies the disassembly. The above mentioned steps are repeated until the platform 7 has been moved to the last tower segment 13.

The platform 7 is moved to the support frame 11. The last tower segment 13 is disconnected from the support frame 11 and is then moved to the ground by means of the crane 21. Again, since the crane 21 is very close to the ground, there is no need for long wires, making the solution less sensitive to wind. By moving the last tower segment 13, the lifting device 2 is liberated and can easily be lifted by a transport vehicle, e.g. a truck, and be removed from the location of the wind turbine 5.

The present invention is not limited to the embodiments disclosed but may be varied and modified within the scope of the following claims. For example, in another embodiment of the invention, the tower segments of the lifting assembly can be telescopic and the platform can be fixedly attached to the top segment. Further, the crane and the first storage area can switch place so that the crane is closer to the wind turbine than the first storage area. The lifting assembly can also be used to build a complete wind turbine, including building the wind tower.

The invention claimed is:

1. A lifting assembly for elevating components to a wind turbine, comprising:
    a plurality of tower segments which together form an elongated tower with an adjustable height, and
    a lifting device including:
    a support frame for supporting the tower,
    a securing assembly for securing the tower to the wind turbine, and
    a crane, wherein the lifting device comprises:
    a platform arranged moveable relative the support frame between a lower position and an upper position, and the platform has a first storage area for supporting components weighing more than 10 tons, the crane is mounted on the platform and is configured to move the components between the platform and the wind turbine when the platform is in the upper position, the platform is provided with an opening adapted to receive the tower segments, the crane and the first storage area are arranged on opposite sides of the opening and one of the tower segments is a top segment, having an upper part provided with a second storage area for supporting components weighing more than 10 tons.

2. The lifting assembly according to claim 1, wherein said top segment comprises a cap connected to said upper part and having an upper surface defining said second storage area.

3. The lifting assembly according to claim 2, wherein said cap is removably connected to the upper part.

4. The lifting assembly according to claim 2, wherein said opening, and the peripheries of the tower segments and the cap are rectangular.

5. The lifting assembly according to claim 1, wherein the lifting device comprises a drive unit for moving the platform and a power generation device configured to generate electric power to said drive unit, and the power generation device is mounted on said platform.

6. The lifting assembly according to claim 1, wherein said platform has a length of at least 4 m and a width of at least 2 m, and preferably said platform has a length of at least 6 m and a width of at least 3 m.

7. The lifting assembly according to claim 1, wherein said crane has a base part and a jib rotatably connected to the base part, and the jib has a maximum length of less than 40 m, and preferably the jib has a maximum length of less than 30 m.

8. The lifting assembly according to claim wherein the weight of the crane is more than 10 tons.

9. The lifting assembly according to claim 1, wherein the weight of the crane is less than 40 tons, and preferably less than 30 tons.

10. The lifting assembly according to claim 1, wherein the platform is provided with extendable beams, for supporting a wind turbine roof.

11. The lifting assembly according to claim 1, wherein the area of each of the first and second storage areas is at least 4 m².

12. A method for using the lifting assembly as defined in claim 1 for replacing an old component of a wind turbine with a new component, wherein the method comprises:
    a) positioning the lifting device on the ground and in close proximity to the wind turbine,
    b) lifting the new component by means of the crane and placing the new component on the first storage area of the platform,
    c) moving one of the tower segments to the support frame in a vertical orientation through the opening of the platform by means of the crane,
    d) connecting the tower segment to the support frame,
    e) vertically moving the platform to an upper end of the tower segment,
    f) lifting another of the tower segments, placing the tower segment in a vertical orientation on the previous tower segment by means of the crane, and mechanically connecting the tower segments to each other,
    g) repeating the steps e-f to build the elongated tower,
    h) lifting the top segment and placing the top segment in a vertical orientation on the previous tower segment by means of the crane, and mechanically connecting the top segment to the previous tower segment,
    i) connecting the top segment to the wind turbine by means of the securing assembly,
    j) vertically moving the platform to the upper part of the tower segment,
    k) mechanically securing the platform to the top segment,
    l) moving the old component from the wind turbine and placing it on the second storage area by means of the crane,
    m) moving the new component from the platform and placing it on the wind turbine by means of the crane,
    n) moving the old component from the second storage area to the first storage area by means of the crane,
    o) removing the mechanical securing of the platform to the top segment,
    p) vertically moving the platform from the tower segment downwards to the previous tower segment,
    q) disconnecting the tower segments from each other,
    r) moving the tower segment to the ground by means of the crane,
    s) repeating the steps p-r until the platform has been moved to the last tower segment,
    t) moving the platform to the support frame,
    u) disconnecting the last tower segment from the support frame, and
    v) moving the last tower segment to the ground by means of the crane.

13. The method according to claim 12, wherein said component is any of a gear box, a generator, and a wind turbine wing.

14. The method according to claim 12 for using the lifting assembly, wherein the method further comprises starting the power generation devices before step b.

15. The method according to claim 12 for using the lifting assembly, wherein the method further comprises the following steps:
    removing the roof of the wind turbine and placing it on the extendable beams on the platform before performing step l, and
    lifting the roof back onto the wind turbine before step o.

* * * * *